(12) United States Patent
Moore et al.

(10) Patent No.: US 7,635,744 B2
(45) Date of Patent: Dec. 22, 2009

(54) TRIFLUOROVINYLOXY MONOMERS AND POLYMERS

(75) Inventors: David Roger Moore, Albany, NY (US); Hongyi Zhou, Niskayuna, NY (US); Christoph Georg Erben, Clifton Park, NY (US); Marianne Elisabeth Harmon, Niskayuna, NY (US); Joyce Hung, Niskayuna, NY (US); Hongwei Liu, Troy, NY (US); Daniel Steiger, Clifton Park, NY (US); Daniel Joseph Brunelle, Burnt Hills, NY (US)

(73) Assignee: General Electric Company, Niskayuna, NY (US)

( * ) Notice: Subject to any disclaimer, the term of this patent is extended or adjusted under 35 U.S.C. 154(b) by 152 days.

(21) Appl. No.: 11/397,109

(22) Filed: Apr. 5, 2006

(65) Prior Publication Data

US 2007/0238856 A1    Oct. 11, 2007

(51) Int. Cl.
C08G 64/00 (2006.01)
C08G 63/02 (2006.01)
(52) U.S. Cl. .......................... 528/196; 106/10; 106/12; 106/13; 204/157.99; 204/158.11; 528/198; 568/842
(58) Field of Classification Search .................. 106/10, 106/12, 13; 204/157.99, 158.11; 528/196, 528/198, 361, 363, 370, 388; 568/842
See application file for complete search history.

(56) References Cited

U.S. PATENT DOCUMENTS

| 5,023,380 A | 6/1991 | Babb et al. |
| 5,037,917 A | 8/1991 | Babb |
| 5,463,005 A | 10/1995 | Desmarteau |
| 6,268,532 B1 | 7/2001 | Desmarteau et al. |
| 6,384,167 B2 | 5/2002 | Desmarteau |
| 6,559,237 B1 * | 5/2003 | Mao et al. ................ 525/326.2 |
| 6,652,779 B1 | 11/2003 | Zhang |

FOREIGN PATENT DOCUMENTS

EP    1405876    *   4/2004

OTHER PUBLICATIONS

"Perfluorocyclobutane Aromatic Polyethers. Synthesis and Characterization of New Siloxane-Containing Fluoropolymers", D.W. Smith, Jr. & D.A. Babb, Macromolecules (1996) pp. 852-860.
Synthesis and Characterization of a Novel Perfluorocyclobutyl Aromatic Ether-Based ABA Triblock Copolymer, X. Huang, G. Lu, D. Peng, S. Zhang & Feng-ling Qing, Macromolecules, (2005), pp. A-G.
"[p-(Trifluorovinyl)oxy)phenyl]lithium: Formation, Synthetic Utility, and Theoretical Support for a Versatile New Reagent in Fluoropolymer Chemistry", Junmin Ji., et al., Organometallics (1998) 17, pp. 783-785.

* cited by examiner

Primary Examiner—Terressa M Boykin
(74) Attorney, Agent, or Firm—Mary Louise Gioeni

(57) ABSTRACT

Reactive monomers containing the trifluorovinyloxy group may be copolymerized to form polymers useful as membranes, especially polymer electrolyte membranes for fuel cells. The monomers have the formula $((CF_2CFO(R^1)_p)_n ArX_2$ wherein
Ar is a trivalent, tetravalent or pentavalent, substituted or unsubstituted, aromatic or heteroaromatic, monocyclic or polycyclic group having from 5 to 50 carbon atoms;
X is OH, SH, $NR^{2a}R^{2b}$, F or Br;
p is 0 or 1;
n is 1, 2 or 3;
$R^1$ is substituted or unsubstituted phenyl and
$R^{2a}$ and $R^{2b}$ are independently H, $C_1$-$C_8$ alkyl or $C_1$-$C_8$ perfluoroalkyl.

37 Claims, No Drawings

TRIFLUOROVINYLOXY MONOMERS AND POLYMERS

BACKGROUND

The invention relates generally to bishydroxyphenyl-functionalized monomers that contain trifluorovinyloxy moieties, and copolymers of those monomers.

Solid polymer electrolyte membrane (PEM) fuel cells have attracted significant attention as a reliable, clean source of energy, in particular for transportation and portable devices. Hydrogen PEM fuel cells generate electricity that can be converted to power through the electrochemical coupling of hydrogen and oxygen and leave water as the product. Fuel cell technology has made significant progress over the last forty years; however, a state-of-the-art fuel cell device with wide ranging applications has not been demonstrated. A key to enabling fuel cell technology lies in discovery of novel, high-performance membrane materials.

Currently, fuel cell membranes are too expensive, exhibit poor chemical, mechanical, and thermal properties, and/or demonstrate insufficient conductivities under the necessary temperature and humidity requirements (0.1 S/cm at 80° C. and 50% relative humidity) to be commercially viable. For example, the cost of NAFION®, the current benchmark membrane material, is an order of magnitude higher than the $2/kW specified by current cost targets. Furthermore, NAFION® suffers from poor performance at high temperatures and low relative humidities.

One obstacle to achieving a highly conductive and mechanically stable PEM is effective water management. Paradoxically, high levels of sulfonation are required to facilitate the movement of protons and water, yet excessive sulfonation leads to extreme membrane swelling, poor solubility properties, and mechanical deformation. Therefore, there remains a need for a means to provide the necessary mechanical integrity necessary to minimize membrane swelling while allowing high concentrations of sulfonation and consequently, elevated levels of pro ion conductivity.

BRIEF DESCRIPTION

It has been unexpectedly discovered that monomers containing the trifluorovinyloxy group may yield highly-conductive, sulfonated polymers that exhibit lower levels of water swelling. Accordingly, in one embodiment, the present invention relates to polyether sulfones and polyarylether ketones containing units derived from trifluorovinyloxy monomers that have the formula $((CF_2=CFO(R^1)_p)_n ArX_2$ wherein
Ar is a trivalent, tetravalent or pentavalent, substituted or unsubstituted, aromatic or heteroaromatic, monocyclic or polycyclic group having from 5 to 50 carbon atoms;
X is OH, SH, $NR^{2a}R^{2b}$, F or Br;
p is 0 or 1;
n is 1, 2 or 3;
$R^1$ is substituted or unsubstituted phenyl and
$R^{2a}$ and $R^{2b}$ are independently H, $C_1$-$C_8$ alkyl or $C_1$-$C_8$ perfluoroalkyl.

In another embodiment, the present invention relates to membranes comprising polymers containing the trifluorovinyloxy group, and in still another embodiment, to fuel cells containing those membranes.

DETAILED DESCRIPTION

The present invention relates to reactive monomers containing the trifluorovinyloxy group, and to polymers derived from condensation copolymerization of the monomers. The monomers have the formula $((CF_2CFO(R^1)_p)_n ArX_2$ wherein
Ar is a trivalent, tetravalent or pentavalent, substituted or unsubstituted, aromatic or heteroaromatic, monocyclic or polycyclic group having from 5 to 50 carbon atoms;
X is OH, SH, $NR^{2a}R^{2b}$, F or Br;
p is 0 or 1;
n is 1, 2 or 3;
$R^1$ is substituted or unsubstituted phenyl and
$R^{2a}$ and $R^{2b}$ are independently H, $C_1$-$C_8$ alkyl or $C_1$-$C_8$ perfluoroalkyl.

In particular embodiments, Ar may be selected from

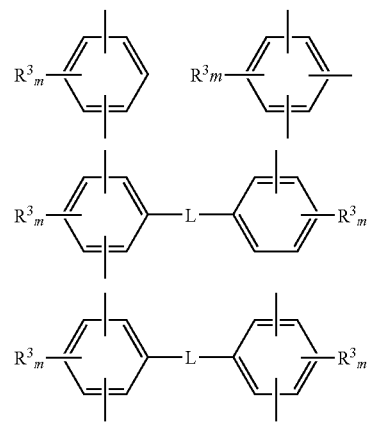

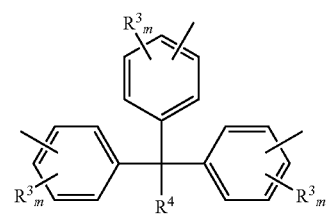

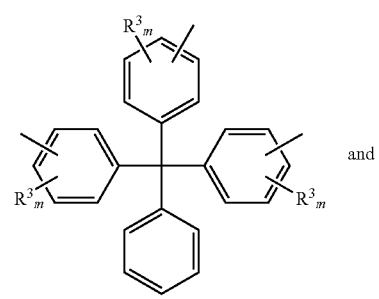

and

-continued

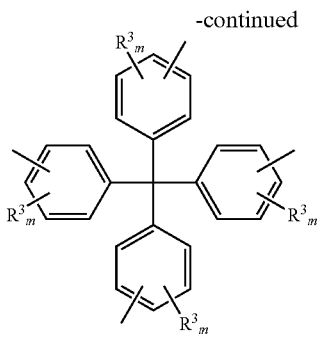

wherein
R³ is H, aryl, substituted aryl, aryloxy, alkylaryl or arylalkyl, perfluoroalkyl, or halo;
R⁴ is H, $C_1$-$C_8$ alkyl, $C_1$-$C_8$ perfluoroalkyl or aryl;
m is 0, 1, 2 or 3; and
L is a direct bond, O, S, CO, $SO_2$, $CR^1R^2$, $C_yH_{2y}$, $C_yF_{2y}$, or O-Z-O and the bonds of the O or the O-Z-O group are in the 3,3'-, 3,4'-, 4,3'-, or the 4,4'-positions; and
Z is selected from

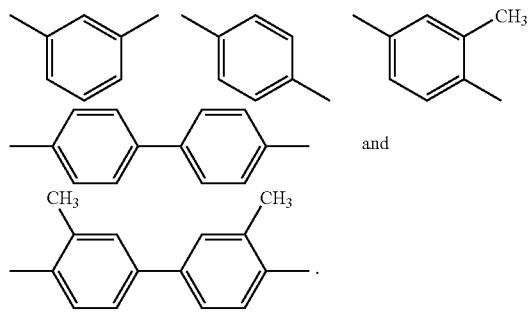

In some embodiments, Ar may be

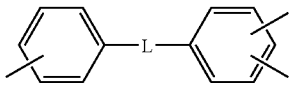

In particular, the reactive monomer may be

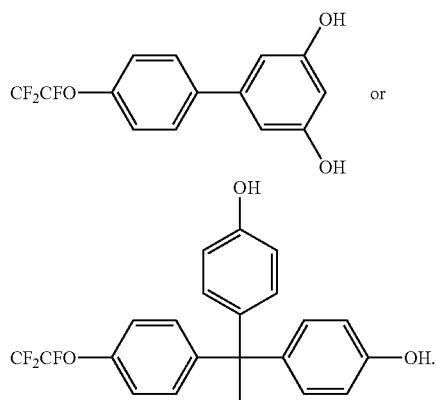

Condensation polymers according to the present invention include polyether sulfones, polyaryletherketones and poly(ether)imides, and sulfonated derivatives thereof. These polymers contain the trifluorovinyloxy group attached to the backbone of the polymer, and are formed by copolymerization of the reactive monomers with dihydroxyaryl monomers and dihalodiarylsulfones, or dihydroxyaryl monomers and dihalodiarylketones, or aromatic dianhydride monomers and aromatic diamine monomers, respectively.

The amount of the trifluorovinyloxy monomer incorporated in the polymer is not critical. Amounts typically range from about 0.1 mol %, based on total moles of monomer, to about 10 mol %. In specific embodiments, the amounts may range from about 0.5 mol % to about 5 mol %. In other embodiments, the amounts may range from about 0.5 mol % to about 2 mol %.

For sulfonated polymers, sulfonation levels typically range from about 30 to about 80 mol %, particularly from about 40 to about 60 mol % sulfonation, and more particularly about 40 mol % sulfonation. The term "mol % sulfonation" means mol % of the structural units derived from a sulfonated monomer and containing at least one sulfonate group, with respect to the total moles of structural units derived from the same monomer, but without sulfonate groups, and particularly refers to mol % of disulfonated structural units. For sulfonation levels less than about 30%, proton conductivity of the membranes is typically low, and for sulfonation levels greater than about 70%, swelling and water uptake may be higher than desirable for PEM applications.

Polyethersulfones

Polyethersulfones contain aryl moieties linked by ether and sulfone groups. The polymers are typically prepared by polycondensation of dihydroxyaryl monomers with dihalodiarylsulfones; alternately, condensation of dihalodiarylsulfone monomers, such as dichlorodiphenylsulfone, with dihydroxydiarylsulfones, such as dihydroxydiphenylsulfone may be used. The dihalomonomers used in this invention are dihaloaromatic compounds known to undergo aromatic nucleophilic displacement reactions to produce polyethers. Other dihalodiaryl monomers such as dihalodiarylketones, dihalobenzonitriles, and bishalophosphinoxides may be used as comonomers with the dihalodiarylsulfone monomers. Aryl groups of any of the sulfone or dihydroxy monomers may be substituted with halogen groups, such as bromo, chloro, fluoro; alkyl groups, particularly $C_1$-$C_8$ alkyl; allyl groups, alkenyl groups, ether groups, alkyl ether groups, and cyano groups. It should be noted that substitution with chloro and/or fluoro groups may lead to branching and crosslinking of the sulfonated polyethersulfone. Examples of suitable dihalodiphenyl sulfones include bis(4-chlorophenyl)sulfone (DCDPS), bis(4-fluorophenyl)sulfone (DFDPS), bis(3,4-dichlorophenyl)sulfone, bis(3,4,5-trichlorophenyl)sulfone, bis(3,4-difluorophenyl)sulfone, bis(4-nitrophenyl)sulfone, bis(4-chloro-3-nitrophenyl)sulfone, 2,4'-dichlorodiphenylsulfone, 2,2'-dichlorodiphenylsulfone, 2,2-dichlorodiphenylsulfone and 2,4-dichlorodiphenylsulfone, 2,4'-difluorodiphenylsulfone 2,2'-difluorodiphenylsulfone, 2,2-difluorodiphenylsulfone, 2,4-difluorodiphenylsulfone, 1,3-bis(4-chlorosulfonylbenzene), 1,4-bis(4-chlorosulfonylbenzene), 1,3-bis(4-fluorosulfonylbenzene), 1,4-bis(4-fluorosulfonylbenzene) also and the like. Suitable dihalonitriles include 2,4-dichlorobenzonitrile, 2,6-dichlorobenzonitrile, 2,4-difluorobenzonitrile, 2,6-difluorobenzonitrile, 3,6-dichlorophthaloylnitrile, 3,6-difluorophthaloylnitrile. Examples of suitable dihalodiarylketone monomers include 4-fluorobenzophenone, 4-chlorobenzophenone, 2,4'-dichlorobenzophenone, 2,2'-dichlorobenzophenone, 2,3,6,7-tetrachloro-9,10-anthracenedione, 3,3',4,4',5,5'-hexachloro-benzophenone, bis(4-chloro-3,5-dinitrophenyl)methanone, 3,6-dichloro-9H-fluoren-9-one, and 3,6-difluoro-9H-fluoren-9-one. Examples of suitable halophosphinoxide monomers include bis(4-fluorophenyl) phenylphosphine oxide, bis(4-chlorophenyl)phenylphosphine oxide, bis(4-bromophenyl)phenylphosphine oxide, tris (4-fluorophenyl)phosphine oxide, tris(4-chlorophenyl) phosphine oxide, tris(4-chloro-3-nitrophenyl)phosphine oxide, bis(p-chlorophenyl)-1-naphthyl-phosphine oxide, bis (4-fluorophenyl)(4-methylphenyl)-phosphine oxide, bis(4-fluorophenyl)(2,3,5,6-tetramethylphenyl)-phosphine oxide, bis(4-fluorophenyl)(3-nitrophenyl)-phosphine oxide, 3-[bis (4-fluorophenyl)phosphinyl]-benzenamine, and bis(4-fluorophenyl)(4-methoxyphenyl)-phosphine oxide. Other potential electrophilic monomers include 1,3-bis(4-chlorobenzoylbenzene), 1,4-bis(4-chlorobenzoylbenzene), 1,3-bis(4-fluorobenzoylbenzene), 1,4-bis(4-fluorobenzoylbenzene), pentafluorobiphenyl, The polyethersulfones additionally include structural units derived from one or more dihydroxyaryl monomers, particularly bisphenol monomers. Examples of suitable dihydroxyaryl monomers include bisphenol A, 4,4'-(hexafluoroisopropylidene)diphenol(6F-bisphenol), 4,4'-biphenol, hydroquinone and phenylphosphine oxide bisphenol. The bisphenol monomers may be either symmetrical or unsymmetrical.

Other dihydroxyaryl monomers that may be used to prepare the polyethersulfones include 1,1-bis(4-hydroxyphenyl) cyclopentane; 2,2-bis(3-allyl-4-hydroxyphenyl)propane; 2,2-bis(2-t-butyl-4-hydroxy-5-methylphenyl)propane; 2,2-bis(3-t-butyl-4-hydroxy-6-methylphenyl)propane; 2,2-bis (3-t-butyl-4-hydroxy-6-methylphenyl)butane; 2,2-bis(3-methyl-4-hydroxyphenyl)propane; 2,2-bis(4-hydroxyphenyl)-1,1,1,3,3,3-hexafluoropropane; 1,1-bis(4-hydroxyphenyl)-2,2,2-trichloroethane; 1,1-bis(4-hydroxyphenyl)norbornane; 1,2-bis(4-hydroxyphenyl)ethane; 1,3-bis(4-hydroxyphenyl) propenone; bis(4-hydroxyphenyl)sulfide; 4,4-bis(4-hydroxyphenyl)pentanoic acid; 4,4-bis(3,5-dimethyl-4-hydroxyphenyl)pentanoic acid; 2,2-bis(4-hydroxyphenyl)acetic acid; 2,4'-dihydroxydiphenylmethane; bis(2-hydroxyphenyl) methane; bis(4-hydroxyphenyl)methane; bis(4-hydroxy-5-nitrophenyl)methane; bis(4-hydroxy-2,6-dimethyl-3-methoxyphenyl)methane; 1,1-bis(4-hydroxyphenyl)ethane; 1,1-bis(4-hydroxy-2-chlorophenyl)ethane; 2,2-bis(4-hydroxyphenyl)propane (bisphenol-A); 1,1-bis(4-hydroxyphenyl)propane; 2,2-bis(3-chloro-4-hydroxyphenyl)propane; 2,2-bis(3-bromo-4-hydroxyphenyl)propane; 2,2-bis(4-hydroxy-3-methylphenyl)propane; 2,2-bis(4-hydroxy-3-isopropylphenyl)propane; 2,2-bis(3-t-butyl-4-hydroxyphenyl)propane; 2,2-bis(3-phenyl-4-hydroxyphenyl)propane; 2,2-bis(3,5-dichloro-4-hydroxyphenyl)propane; 2,2-bis(3,5-dibromo-4-hydroxyphenyl)propane; 2,2-bis(3,5-dimethyl-4-hydroxyphenyl)propane; 2,2-bis(3-chloro-4-hydroxy-5-methylphenyl)propane; 2,2-bis(3-bromo-4-hydroxy-5-methylphenyl)propane; 2,2-bis(3-chloro-4-hydroxy-5-isopropylphenyl)propane; 2,2-bis(3-bromo-4-hydroxy-5-isopropylphenyl)propane; 2,2-bis(3-t-butyl-5-chloro-4-hydroxyphenyl)propane; 2,2-bis(3-bromo-5-t-butyl-4-hydroxyphenyl)propane; 2,2-bis(3-chloro-5-phenyl-4-hydroxyphenyl)propane; 2,2-bis(3-bromo-5-phenyl-4-hydroxyphenyl)propane; 2,2-bis(3,5-diisopropyl-4-hydroxyphenyl)propane; 2,2-bis(3,5-di-t-butyl-4-hydroxyphenyl)propane; 2,2-bis(3,5-diphenyl-4-hydroxyphenyl)propane; 2,2-bis(4-hydroxy-2,3,5,6-tetrachlorophenyl)propane; 2,2-bis(4-hydroxy-2,3,5,6-tetrabromophenyl)propane; 2,2-bis(4-hydroxy-2,3,5,6-tetramethylphenyl)propane; 2,2-bis(2,6-dichloro-3,5-dimethyl-4-hydroxyphenyl)propane; 2,2-bis(2,6-dibromo-3,5-dimethyl-4-hydroxyphenyl)propane; 2,2-bis(4-hydroxy-3-ethylphenyl)propane; 2,2-bis(4-hydroxy-3,5-dimethylphenyl)propane; 2,2-bis(3,5,3',5'-tetrachloro-4,4'-dihydroxyphenyl)propane; 1,1-bis(4-hydroxyphenyl) cyclohexylmethane; 2,2-bis(4-hydroxyphenyl)-1-phenylpropane; 1,1-bis(4-hydroxyphenyl)cyclohexane; 1,1-bis(3-chloro-4-hydroxyphenyl)cyclohexane; 1,1-bis(3-bromo-4-hydroxyphenyl)cyclohexane; 1,1-bis(4-hydroxy-3-methylphenyl)cyclohexane; 1,1-bis(4-hydroxy-3-isopropylphenyl)cyclohexane; 1,1-bis(3-t-butyl-4-hydroxyphenyl)cyclohexane; 1,1-bis(3-phenyl-4-hydroxyphenyl)cyclohexane; 1,1-bis(3,5-dichloro-4-hydroxyphenyl)cyclohexane; 1,1-bis(3,5-dibromo-4-hydroxyphenyl)cyclohexane; 1,1-bis(3,5-dimethyl-4-hydroxyphenyl)cyclohexane; 1,1-bis(3-chloro-4-hydroxy-5-methylphenyl)cyclohexane; 1,1-bis(3-bromo-4-hydroxy-5-methylphenyl)cyclohexane; 1,1-bis(3-chloro-4-hydroxy-5-isopropylphenyl)cyclohexane; 1,1-bis(3-bromo-4-hydroxy-5-isopropylphenyl)cyclohexane; 1,1-bis(3-t-butyl-4-hydroxy-5-t-butyl-4-hydroxyphenyl)cyclohexane; 1,1-bis(3-bromo-5-t-butyl-4-hydroxyphenyl)cyclohexane; 1,1-bis(3-chloro-5-phenyl-4-hydroxyphenyl)cyclohexane; 1,1-bis(3-bromo-5-phenyl-4-hydroxyphenyl)cyclohexane; 1,1-bis(3,5-diisopropyl-4-hydroxyphenyl)cyclohexane; 1,1-bis(3,5-di-t-butyl-4-hydroxyphenyl)cyclohexane; 1,1-bis(3,5-diphenyl-4-hydroxyphenyl)cyclohexane; 1,1-bis(4-hydroxy-2,3,5,6-tetrachlorophenyl)cyclohexane; 1,1-bis(4-hydroxy-2,3,5,6-tetrabromophenyl)cyclohexane; 1,1-bis(4-hydroxy-2,3,5,6-tetramethylphenyl)cyclohexane; 1,1-bis(2,6-dichloro-3,5-dimethyl-4-hydroxyphenyl)cyclohexane; 1,1-bis(2,6-dibromo-3,5-dimethyl-4-hydroxyphenyl)cyclohexane; 1,1-bis(4-hydroxyphenyl)-3,3,5-trimethylcyclohexane; 1,1-bis(3-chloro-4-hydroxyphenyl)-3,3,5-trimethylcyclohexane; 1,1-bis(3-bromo-4-hydroxyphenyl)-3,3,5-trimethylcyclohexane; 1,1-bis(4-hydroxy-3-methylphenyl)-3,3,5-trimethylcyclohexane; 1,1-bis(4-hydroxy-3-isopropylphenyl)-3,3,5-trimethylcyclohexane; 1,1-bis(3-t-butyl-4-hydroxyphenyl)-3,3,5-trimethylcyclohexane; 1,1-bis(3-phenyl-4-hydroxyphenyl)-3,3,5-trimethylcyclohexane; 1,1-bis(3,5-dichloro-4-hydroxyphenyl)-3,3,5-trimethylcyclohexane; 1,1-bis(3,5-dibromo-4-hydroxyphenyl)-3,3,5-trimethylcyclohexane; 1,1-bis(3,5-dimethyl-4-hydroxyphenyl)-3,3,5-trimethylcyclohexane; 1,1-bis(3-chloro-4-hydroxy-5-methylphenyl)-3,3,5-trimethylcyclohexane; 1,1-bis(3-bromo-4-hydroxy-5-methylphenyl)-3,3,5-trimethylcyclohexane; 1,1-bis(3-chloro-4-hydroxy-5-isopropylphenyl)-3,3,5-trimethylcyclohexane; 1,1-bis(3-bromo-4-hydroxy-5-isopropylphenyl)-3,3,5-trimethylcyclohexane; 1,1-bis(3-t-butyl-5-chloro-4-hydroxyphenyl)-3,3,5-trimethylcyclohexane; 1,1-bis(3-bromo-5-t-butyl-4-hydroxyphenyl)-3,3,5-trimethylcyclohexane; bis(3-chloro-5-phenyl-4-hydroxyphenyl)-3,3,5-trimethylcyclohexane; 1,1-bis(3-bromo-5-phenyl-4-hydroxyphenyl)-3,3,5-trimethylcyclohexane; 1,1-bis(3,5-disopropyl-4-hydroxyphenyl)-3,3,5-trimethylcyclohexane; 1,1-bis(3,5-di-t-butyl-4-hydroxyphenyl)-3,3,5-trimethylcyclohexane; 1,1-bis(3,5-diphenyl-4-hydroxyphenyl)-3,3,5-trimethylcyclohexane; 1,1-bis(4-hydroxy-2,3,5,6-tetrachlorophenyl)-3,3,5-trimethylcyclohexane; 1,1-bis(4-hydroxy-2,3,5,6-tetrabromophenyl)-3,3,5-trimethylcyclohexane; 1,1-bis(4-hydroxy-2,3,5,6- tetramethylphenyl)-3,3,5-trimethylcyclohexane; 1,1-bis(2,6-dichloro-3,5-dimethyl-4-hydroxyphenyl)-3,3,5-trimethylcyclohexane; 1,1-bis(2,6-dibromo-3,5-dimethyl-4-hydroxyphenyl)-3,3,5-trimethylcyclohexane; 4,4-bis(4-hydroxyphenyl)heptane; 1,1-bis(4-hydroxyphenyl)decane; 1,1-bis(4-hydroxyphenyl)cyclododecane; 1,1-bis(3,5-dimethyl-4-hydroxyphenyl)cyclododecane; and bis(4-hydroxyphenyl)methane.

Polyaryletherketones

Polyaryletherketones contain aryl moieties linked by ether and ketone groups. The polymers are typically prepared by polycondensation of dihydroxyaryl monomers with dihalodiarylketones such as substituted or unsubstituted dihalobenzophenones. Dihalodiarylsulfone monomers and/or dihalophosphine oxide monomers such as described above may be used as comonomers with the dihalodiarylketones. Aryl groups of any of the sulfone or dihydroxy monomers may be substituted with halogen groups, such as bromo, chloro, fluoro; alkyl groups, particularly $C_1$-$C_8$ alkyl; allyl groups, alkenyl groups, ether groups, alkyl ether groups, and cyano groups. Examples of suitable dihalodiarylketones include substituted or unsubstituted dihalobenzophenone such as 4-fluorobenzophenone or 4-chlorobenzophenone, or from a di(halobenzoyl)benzene such as 1,4-bis-(4-fluorobenzoyl)benzene or 1,4-bis-(4-chlorobenzoyl)benzene. Suitable dihydroxyaryl monomers include those described above for use in preparing polyether sulfones.

The polyethersulfones and polyaryletherketones may be prepared by base-mediated direct nucleophilic aromatic substitution. Suitable solvents for the polymerization reaction include aromatic solvents such as toluene, xylene, anisole, chlorobenzene, and ortho-dichlorobenzene, as well as polar aprotic solvents such as N-methylpyrrolidinone, N,N-dimethylacetamide, dimethylsulfoxide, dimethylformamide, diphenylsulfone, and sulfolane. Suitable bases include inorganic bases such as sodium carbonate, sodium hydroxide, potassium carbonate, potassium hydroxide, lithium carbonate, lithium hydroxide, cesium carbonate and mixtures thereof. Synthetically useful reaction rates are typically achieved at reaction temperatures ranging between about 80° C. and about 200° C.

Polyimides

Polyimides contain units derived from condensation of aromatic dianhydride monomers with aromatic diamine monomers. Aliphatic dianhydride and/or diamine monomers, particularly perfluorinated analogs, may be copolymerized with the aromatic dianhydride and diamine monomers, although wholly aromatic polyimides may be preferred for their superior physical and chemical properties.

Examples of aromatic dianhydrides suitable for use in the polyimides of the present invention are disclosed, for example, in U.S. Pat. Nos. 3,972,902 and 4,455,410, and include 2,2-bis[4-(3,4-dicarboxyphenoxy)phenyl]propane dianhydride; 4,4'-bis(3,4-dicarboxyphenoxy)diphenyl ether dianhydride; 4,4'-bis(3,4-dicarboxyphenoxy)diphenyl sulfide dianhydride; 4,4'-bis(3,4-dicarboxyphenoxy)benzophenone dianhydride; 4,4'-bis(3,4-dicarboxyphenoxy)diphenyl sulfone dianhydride; 2,2-bis[4-(2,3-dicarboxyphenoxy)phenyl]propane dianhydride; 4,4'-bis(2,3-dicarboxyphenoxy)diphenyl ether dianhydride; 4,4'-bis(2,3-dicarboxyphenoxy)diphenyl sulfide dianhydride; 4,4'-bis(2,3-dicarboxyphenoxy)benzophenone dianhydride; 4,4'-bis(2,3-dicarboxyphenoxy)diphenyl sulfone dianhydride; 4-(2,3-dicarboxyphenoxy)-4'-(3,4-dicarboxyphenoxy)diphenyl-2,2-propane dianhydride; 4-(2,3-dicarboxyphenoxy)-4'-(3,4-dicarboxyphenoxy)diphenyl ether dianhydride; 4-(2,3-dicarboxyphenoxy)-4'-(3,4-dicarboxyphenoxy)diphenyl sulfide dianhydride; 4-(2,3-dicarboxyphenoxy)-4'-(3,4-dicarboxyphenoxy)benzophenone dianhydride and 4-(2,3-dicarboxyphenoxy)-4'-(3,4-dicarboxyphenoxy)diphenyl sulfone dianhydride, as well as mixtures thereof.

Examples of aromatic diamines suitable for use in the polyimides of the present invention include benzidine or 4,4'-diaminobiphenyl and its sulfonated derivatives, 4,4'-diamino-2,2'-biphenyldisulfonic acid and sodium and potassium salts thereof. Examples of other suitable aromatic diamines include m- and p-phenylenediamine, 2,4-diaminotoluene, 2,6-diaminotoluene, m-xylylenediamine, p-xylylenediamine, 2-methyl-4,6-diethyl-1,3-phenylenediamine, 5-methyl-4,6-diethyl-1,3-phenylenediamine, 3,3'-dimethylbenzidine, 3,3'-dimethoxybenzidine, 1,5-diaminonaphthalene, bis(4-aminophenyl)methane, bis(2-chloro-4-amino-3,5-diethylphenyl)methane, bis(4-aminophenyl)propane, 2,4-bis(p-amino-t-butyl)toluene, bis(p-b-amino-t-butylphenyl)ether, bis(p-methyl-b-amino-phenyl)benzene, bis(p-methyl-b-aminopentyl)benzene, 1,3-diamino-4-isopropylbenzene, 2,4,6-trimethyl-1,3-diaminobenzene; 2,3,5,6-tetramethyl-1,4-diaminobenzene; 1,2-bis(4-aminoanilino) cyclobutene-3,4-dione, bis(2-chloro-4-amino-3,5-diethylphenyl)methane, 3,4'-diaminodiphenyl, 3,3'-dimethyl-4,4'-diaminodiphenyl, 3,3'-dimethoxy-4,4'-diaminodiphenyl, 2,2',6,6'-tetramethyl-4,4'-diaminobiphenyl; 3,3'-dimethoxy-4,4'-diaminobiphenyl; 4,4'-diaminodiphenylmethane, 3,3'-diaminodiphenylmethane, 3,4'-diaminodiphenyl methane, 1,3-bis(3-aminophenoxy)benzene, 1,3-bis(4-aminophenoxy)benzene, 1,4-bis(4-aminophenoxybenzene), bis(4-(4-aminophenoxy)phenyl)sulfone, bis(4-(3-aminophenoxy)phenyl)sulfone, 4-(4-aminophenoxy)phenyl)(4-(3-aminophenoxy)phenyl)sulfone, 4,4'-bis(3-aminophenoxy)biphenyl, 4,4'-bis(4-aminophenoxy)biphenyl, 4-(3-aminophenoxy)-4'-(4-aminophenoxy)biphenyl, 2,2'-bis(4-(4-aminophenoxy)phenyl)propane, 2,2-bis[4-(4-aminophenoxy)phenyl] hexafluoropropane, 4,4'-bis(aminophenyl) hexafluoropropane, 4,4'-diamino diphenyl ether, 3,4'-diaminodiphenyl ether, 3,3'-diaminodiphenyl ether, 4,4'-diaminodiphenylsulfide, 3,4'-diaminodiphenylsulfide, 3,3'-diamino diphenylsulfide, 3,3'-diaminodiphenylsulfone, 4,4'-diaminodiphenyl sulfone, 3,4'-diaminodiphenyl sulfone, 4,4'-(9-fluorenylidene)dianiline; 4,4'-diaminodiphenyl ketone, 3,4'-diaminodiphenyl ketone, and 3,3'-diaminodiphenyl ketone. Mixtures of these compounds may also be used. Sulfonated derivatives of these monomers may also be used in the acid form or as their sodium and potassium salts.

Aliphatic diamine monomers may also be employed where the physical and chemical properties of the polymer are not critical. Examples of suitable monomers are ethylenediamine, propylenediamine, trimethylenediamine, diethylenetriamine, triethylenetetramine, hexamethylenediamine, heptamethylenediamine, octamethylene diamine, nonamethylenediamine, decamethylenediamine, 1,12-dodecanediamine, 1,18-octadecanediamine, 3-methylheptamethylenediamine, 4,4-dimethylhepta methylenediamine, 4-methylnonamethylenediamine, 5-methylnonamethylenediamine, 2,5-dimethylhexamethylenediamine, 2,5-dimethylheptamethylenediamine, 2,2-dimethylpropylenediamine, N-methyl-bis(3-aminopropyl)amine, 3-methoxy hexamethylenediamine, 1,2-bis(3-aminopropoxy)ethane, bis(3-aminopropyl)sulfide, 1,4-cyclohexanediamine, and bis-(4-aminocyclohexyl)methane.

Molecular weight of the polymers containing the trifluorovinyloxy monomer is not critical. Weight average molecular weight (Mw) typically ranges from about 5,000 to about 300,000 Daltons, and particularly from about 40,000 to about 150,000 Daltons as measured by gel permeation chromatography using a polystyrene standard.

Definitions

In the context of the present invention, alkyl is intended to include linear, branched, or cyclic hydrocarbon structures and combinations thereof, including lower alkyl and higher alkyl. Preferred alkyl groups are those of $C_{20}$ or below. Lower alkyl refers to alkyl groups of from 1 to 6 carbon atoms, preferably from 1 to 4 carbon atoms, and includes methyl, ethyl, n-propyl, isopropyl, and n-, s- and t-butyl. Higher alkyl refers to alkyl groups having seven or more carbon atoms, preferably 7-20 carbon atoms, and includes n-, s- and t-heptyl, octyl, and dodecyl. Cycloalkyl is a subset of alkyl and includes cyclic hydrocarbon groups of from 3 to 8 carbon atoms. Examples of cycloalkyl groups include cyclopropyl, cyclobutyl, cyclopentyl, and norbornyl.

Aryl and heteroaryl mean a 5- or 6-membered aromatic or heteroaromatic ring containing 0-3 heteroatoms selected from nitrogen, oxygen or sulfur; a bicyclic 9- or 10-membered aromatic or heteroaromatic ring system containing 0-3 heteroatoms selected from nitrogen, oxygen or sulfur; or a tricyclic 13- or 14-membered aromatic or heteroaromatic ring system containing 0-3 heteroatoms selected from nitrogen, oxygen or sulfur. The aromatic 6- to 14-membered carbocyclic rings include, for example, benzene, naphthalene, indane, tetralin, and fluorene; and the 5- to 10-membered aromatic heterocyclic rings include, e.g., imidazole, pyridine, indole, thiophene, benzopyranone, thiazole, furan, benzimidazole, quinoline, isoquinoline, quinoxaline, pyrimidine, pyrazine, tetrazole and pyrazole.

Arylalkyl means an alkyl residue attached to an aryl ring. Examples are benzyl and phenethyl. Heteroarylalkyl means an alkyl residue attached to a heteroaryl ring. Examples include pyridinylmethyl and pyrimidinylethyl. Alkylaryl means an aryl residue having one or more alkyl groups attached thereto. Examples are tolyl and mesityl.

Alkoxy or alkoxyl refers to groups of from 1 to 8 carbon atoms of a straight, branched, cyclic configuration and combinations thereof attached to the parent structure through an oxygen atom. Examples include methoxy, ethoxy, propoxy, isopropoxy, cyclopropyloxy, and cyclohexyloxy. Lower alkoxy refers to groups containing one to four carbons.

Acyl refers to groups of from 1 to 8 carbon atoms of a straight, branched, cyclic configuration, saturated, unsaturated and aromatic and combinations thereof, attached to the parent structure through a carbonyl functionality. One or more carbons in the acyl residue may be replaced by nitrogen, oxygen or sulfur as long as the point of attachment to the parent remains at the carbonyl. Examples include acetyl, benzoyl, propionyl, isobutyryl, t-butoxycarbonyl, and benzyloxycarbonyl. Lower-acyl refers to groups containing one to four carbons.

Heterocycle means a cycloalkyl or aryl residue in which one to three of the carbons is replaced by a heteroatom such as oxygen, nitrogen or sulfur. Examples of heterocycles that fall within the scope of the invention include pyrrolidine, pyrazole, pyrrole, indole, quinoline, isoquinoline, tetrahydroisoquinoline, benzofuran, benzodioxan, benzodioxole (commonly referred to as methylenedioxyphenyl, when occurring as a substituent), tetrazole, morpholine, thiazole, pyridine, pyridazine, pyrimidine, thiophene, furan, oxazole, oxazoline, isoxazole, dioxane, and tetrahydrofuran, triazole, benzotriazole, and triazine.

Substituted refers to structural units, including, but not limited to, alkyl, alkylaryl, aryl, arylalkyl, and heteroaryl, wherein up to three H atoms of the residue are replaced with lower alkyl, substituted alkyl, aryl, substituted aryl, haloalkyl, alkoxy, carbonyl, carboxy, carboxalkoxy, carboxamido, acyloxy, amidino, nitro, halo, hydroxy, $OCH(COOH)_2$, cyano, primary amino, secondary amino, acylamino, alkylthio, sulfoxide, sulfone, phenyl, benzyl, phenoxy, benzyloxy, heteroaryl, or heteroaryloxy; each of said phenyl, benzyl, phenoxy, benzyloxy, heteroaryl, and heteroaryloxy is optionally substituted with 1-3 substituents selected from lower alkyl, alkenyl, alkynyl, halogen, hydroxy, haloalkyl, alkoxy, cyano, phenyl, benzyl, benzyloxy, carboxamido, heteroaryl, heteroaryloxy, nitro or —NRR (wherein R is independently H, lower alkyl or cycloalkyl, and —RR may be fused to form a cyclic ring with nitrogen).

Haloalkyl refers to an alkyl residue, wherein one or more H atoms are replaced by halogen atoms; the term haloalkyl includes perhaloalkyl. Examples of haloalkyl groups that fall within the scope of the invention include $CH_2F$, $CHF_2$, and $CF_3$.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

EXAMPLES

General

A crosslinkable resorcinol-derived monomer, 5-[4-((trifluorovinyl)oxy)-phenyl]resorcinol, was synthesized via a convergent synthesis from 5-bromo-1,3-(2-tetrahydro-2H-pyran)resorcinol and 5-[4-((trifluorovinyl)oxy)phenyl]resorcinol (Scheme 1, 2, and 3).

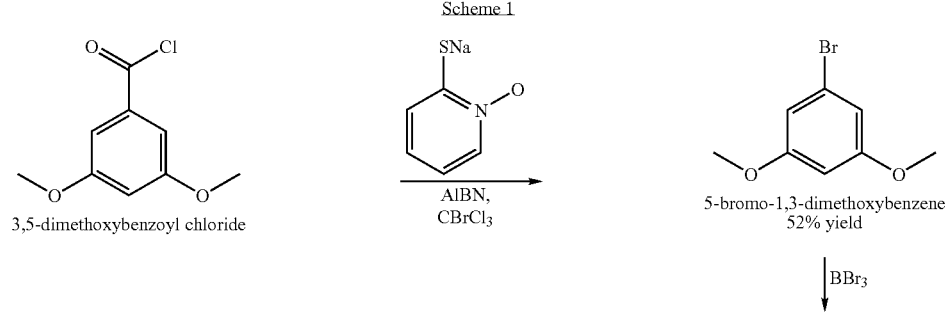

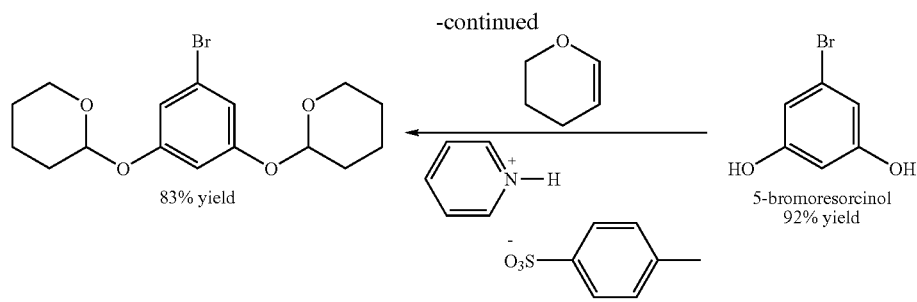

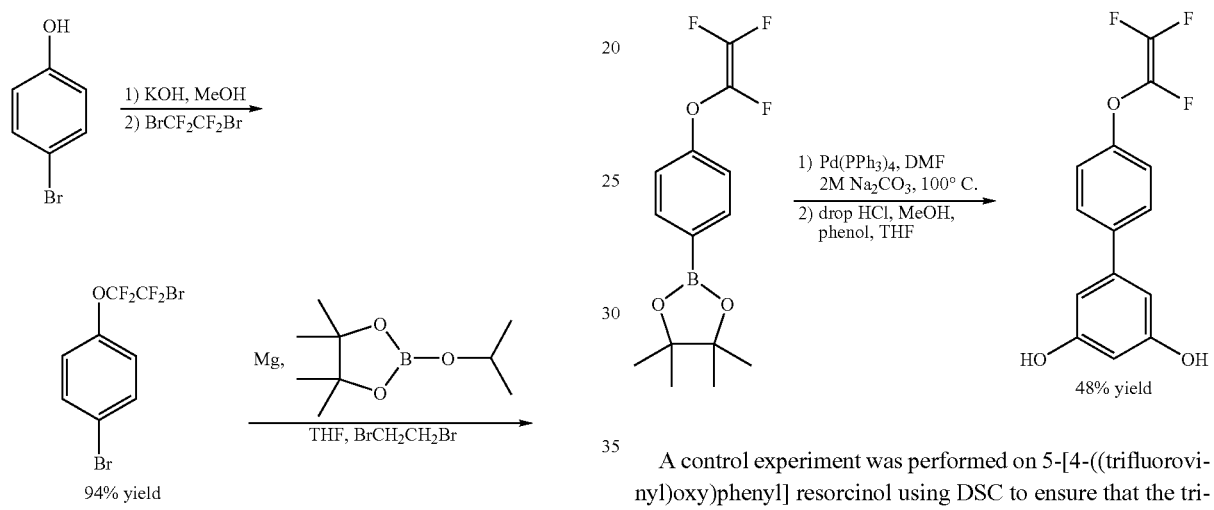

A control experiment was performed on 5-[4-((trifluorovinyl)oxy)phenyl] resorcinol using DSC to ensure that the trifluorovinyloxy moiety could dimerize. The dimerization reaction is illustrated in Scheme 4. The resorcinol monomer melted at 134° C., as evidenced by a large endotherm. The thermal dimerization of the trifluorovinyloxy moiety to the perfluorocyclobutane ring initiated at 195° C. and continued up to 290° C., as indicated by a broad exotherm. On a second thermal scan, unique thermal behavior was observed, including a glass transition at 91° C., and a melting point at 210° C.

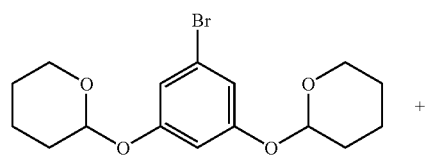

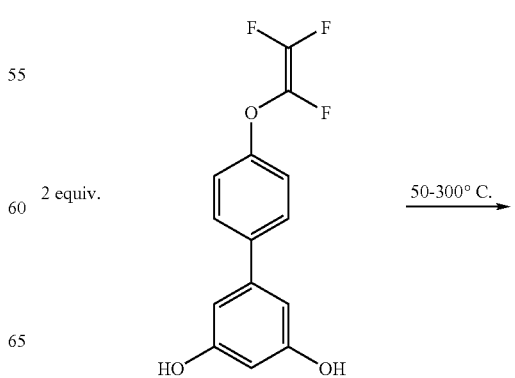

-continued

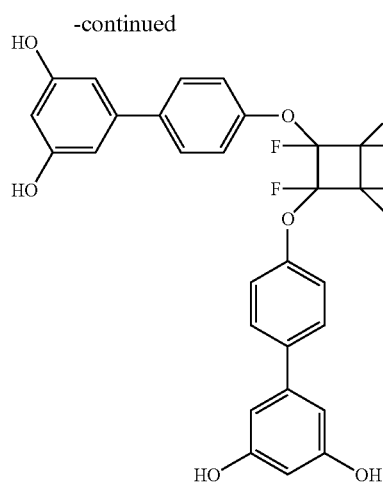

The copolymerization of biphenol (1.225 g, 6.577 mmol), 5-[4-((trifluorovinyl)oxy)-phenyl]resorcinol (18.7 mg, 0.0663 mmol), 4,4'-difluoro-phenylsulfone (DFDPS) and 4,4'-difluoro-3,3'-disodiumsulfonated-phenylsulfone (s-DFDPS) was performed in NMP and toluene with 0.96 M HEGCl/o-DCB at 120° C. (Scheme 5). HECGl serves as a phase transfer catalyst that allows for remarkable reduced polymerization temperatures. Membranes were cast on a glass substrate from either DMAc or DMSO using a doctor blade to control film thickness. Acidification of the sulfonate moieties was performed in 1 M $H_2SO_{4(aq)}$ to yield flexible and durable films.

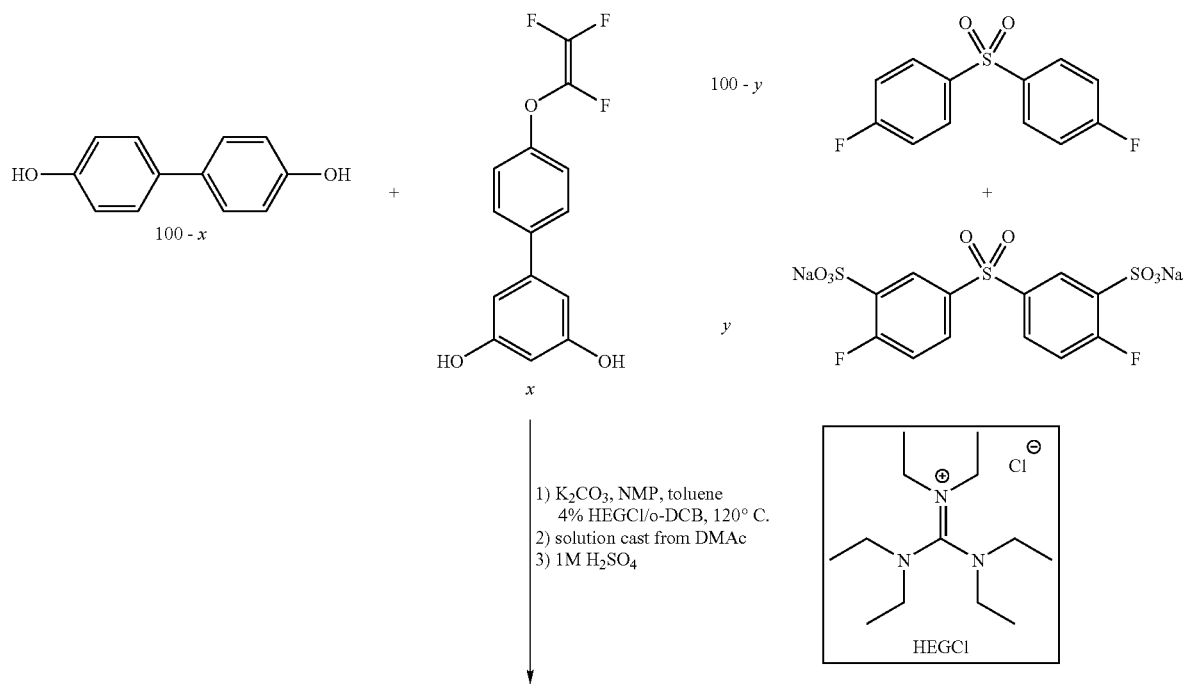

Scheme 5

-continued

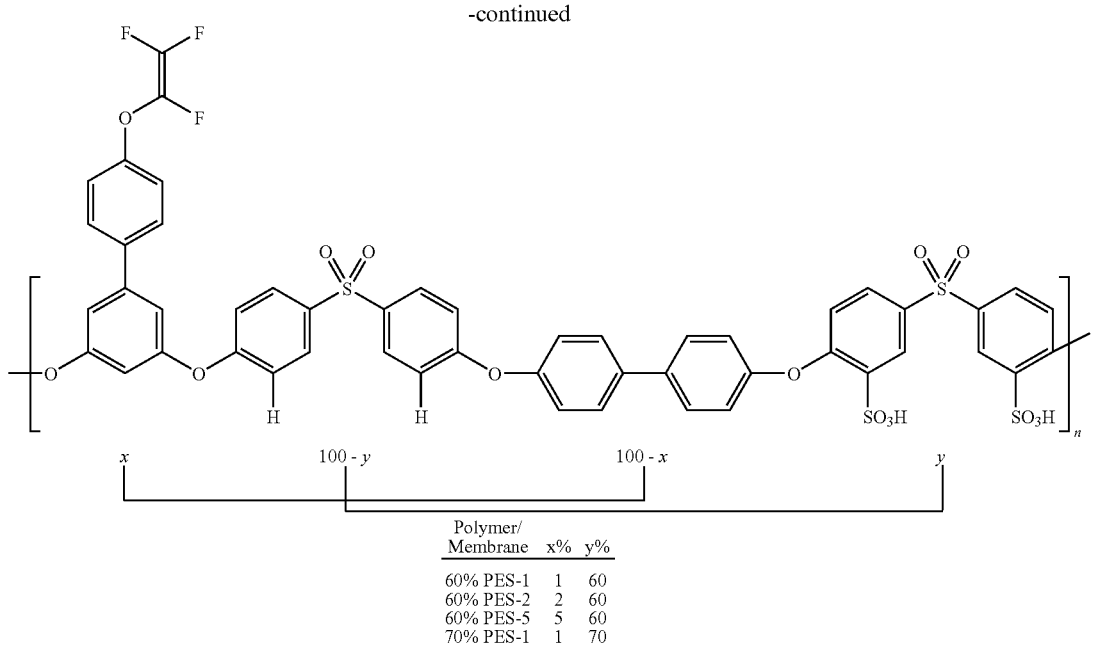

| Polymer/Membrane | x% | y% |
|---|---|---|
| 60% PES-1 | 1 | 60 |
| 60% PES-2 | 2 | 60 |
| 60% PES-5 | 5 | 60 |
| 70% PES-1 | 1 | 70 |

General Procedures

Tetrahydrofuran, toluene, and NMP were purified through a Solv-Tek solvent purification system, containing columns packed with activated R3-15 deoxygenation catalyst and 8-14 mesh activated alumina (Solv-Tek, Inc. 216 Lewisville Road Berryville, Va. 22611, sales@solvtek.com). Pd(PPh$_3$)$_4$ was purchased from Strem Chemicals, and used as received. 5-Bromoresorcinol and 4-(2-bromotetrafluoroethoxy)bromobenzene were synthesized according to literature procedures. (See Dol, G. C.; Kamer, P. C. J.; van Leeuwen, P. W. N. M. *Eur. J. Org. Chem.* 1998, 359-364 and Smith, D. W., Jr.; Babb, D. A. *Macromolecules* 1996, 29, 852-860). All other chemicals were purchased from Aldrich and used as received, unless otherwise noted. All reactions with air- and/or water-sensitive compounds were carried out under dry nitrogen (purified through Trigon Technologies Big Moisture Traps) using standard Schlenk line techniques. NMR spectra were recorded on a Bruker Avance 400 ($^1$H, 400 MHz) spectrometer and referenced versus residual solvent shifts. Molecular weights are reported as number average ($M_n$) or weight average ($M_w$) molecular weight and were determined by gel permeation chromatography (GPC) analysis on a Perkin Elmer Series 200 instrument equipped with RI detector. Polyethyleneoxide molecular weight standards were used to construct a broad standard calibration curve against which polymer molecular weights were determined. The temperature of the gel permeation column (Polymer Laboratories PLgel 5 μm MIXED-C, 300×7.5 mm) was 40° C. and the mobile phase was 0.05 M LiBr in DMAc. Polymer thermal analysis was performed on a Perkin Elmer DSC7 equipped with a TAC7/DX thermal analyzer and processed using Pyris Software. Glass transition temperatures were recorded on the second heating scan.

Example 1

Synthesis of 5-Bromo-1,3-(2-tetrahydro-2H-pyran)resorcinol

5-Bromoresorcinol (6.89 g, 36.5 mmol) and pyridinium p-toluenesulfonate (0.14 g, 0.56 mmol) were added with chloroform to a 500 ml round-bottomed flask. While stirring, 3,4-dihydro-2H-pyran (10.0 ml, 110 mmol) was added dropwise over 30 minutes. After an additional 30 minutes, all solids were dissolved in solution. Spot TLC showed full conversion to product. 2M NaOH$_{(aq)}$ (18 ml, 36 mmol) was added and the biphasic mixture was stirred vigorously for 1 hour. The yellow organic layer was collected and the aqueous layer washed with chloroform (3×30 ml). The combined organic layers were washed with water (1×100 ml) and brine (1×100 ml), dried over MgSO$_4$, filtered, and dried in vacuo to leave a dark yellow oil. The product was precipitated as an off-white solid by dissolving the oil in a minimal amount of ethanol (10 ml) and adding a 1:1 solution (50 ml) of acetonitrile:water (10.8 g, 83% yield). $^1$H NMR (CDCl$_3$, 400 MHz) δ 6.89 (2H, bs, ArH), 6.72 (1H, bs, ArH), 5.39 (2H, m, CH), 3.89 (2H, m, CH$_a$H$_b$O), 3.64 (2H, m, CH$_a$H$_b$O), 1.6-2.2 (12H, bm, CH$_2$).

Example 2

Synthesis of Trifluorovinyl-4-(4,4,5,5-Tetramethyl-1,3,2-dioxaborolan-2-yl)oxybenzene Magnesium turnings were activated by washing with 15% HCl (aq)(v/v) followed by washing with water, then acetone, and drying in vacuo. Under nitrogen atmosphere, 4-(2-bromotetrafluoroethoxy)bromobenzene (36.85 g, 104.7 mmol) magnesium turnings (8.60 g, 354 mmol), THF (159 ml), and 2-isopropoxy-4-4,4,5,5-tetramethyl-1,3,2-dioxaborolane (24.0 ml, 118 mmol) were added to an oven-dried, 500 ml, three-necked round bottom flask equipped with a thermocouple and refluxing condenser. 1,2-Dibromoethane (0.50 ml, 5.8 mmol) was added via syringe to the stirring mixture at room temperature. After approximately 5 minutes, the reaction initiated and the temperature rose. Note: Grignard reactions are highly exothermic, so the necessary precautions must be taken to prevent potential explosions. The reaction was stirred for 12 hours and then CH$_2$Cl$_2$ (200 ml) and water (200 ml) were added. The biphasic mixture was filtered, the organic layer collected and the aqueous layer washed with $CH_2Cl_2$ (3×200 ml). The combined organic layers were washed with brine (3×300 ml), dried over $MgSO_4$, filtered, and dried in vacuo to leave a brown oily solid. The product was purified by fractional vacuum distillation (75 mm Hg, 80-83° C.) to give a white solid (16.0 g, 51% yield). $^1H$ NMR (DMSO-$d_6$, 400 MHz) δ 7.85 (2H, d, J=8.6 Hz, ArH), 7.11 (2H, d, J=8.6 Hz, ArH), 1.36 (12H, s, $CH_3$).

Example 3

Synthesis of 5-[4-((Trifluorovinyl)oxy)phenyl]resorcinol

In an oven-dried Schlenk tube, trifluorovinyl-4-(4,4,5,5-Tetramethyl-1,3,2-dioxaborolan-2-yl)oxybenzene (1.98 g, 6.60 mmol), 5-bromo-1,3-(2-tetrahydro-2H-pyran)resorcinol (1.58 g, 4.42 mmol), and $Pd(PPh_3)_4$ (0.255 g, 0.221 mmol) were added and the flask was evacuated. DMF (12.0 ml) and 2M $Na_2CO_{3(aq)}$ (5.0 ml, 10.0 mmol) were added via syringe. The flask was slightly evacuated to remove the headspace, and the reaction was stirred vigorously at 100° C. for 24 hours. The mixture was cooled to RT, water (50 ml) was added, and $CH_2Cl_2$ (3×75 ml) was used to extract the crude material. The organic fractions were combined, washed with water (1×100 ml), and brine (1×100 ml), dried over $MgSO_4$, filtered, and dried in vacuo. Silica gel chromatography was used to purify the THP-protected compound (gradient elution 10% to 15% EtOAc/hexane). The colorless oil was dissolved in THF (10 ml) and MeOH (2 ml) and phenol (1.35 g, 14.3 mmol) was added. A catalytic amount of conc. HCl (4 drops) was added. Saturated NaHCO3 (aq)(10 ml) was added, the organics were extracted with EtOAc (3×50 ml), the combined organic fractions were washed with brine (1×100 ml), dried over $MgSO_4$, filtered, and dried in vacuo to leave a light yellow oil. Silica gel chromatography was used to purify the title compound (gradient elution 20% to 50% EtOAc/hexane). The resultant solid was then recrystallized from an chloroform:hexane (3:1) solution at RT to give the title compound as an off-white feathery solid (0.597 g, 48% yield). $^1H$ NMR (DMSO-$d_6$, 400 MHz) δ 9.38 (2H, s, OH), 7.59 (2H, d, J=8.8 Hz, ArH), 7.33 (2H, d, J=8.8 Hz, ArH), 6.45 (2H, d, J=2 Hz, ArH), 6.23 (1H, t, J=2 Hz, ArH). $^{19}F$ NMR (DMSO-$d_6$, 554 MHz) δ-119.0, -126.8, -134.5.

General Polymerization Procedure

All polymerizations were carried in an oven-dried round bottom flask equipped with a mechanical stirrer, an addition funnel, and a simple distillation apparatus.

Example 4

Polyethersulfone Synthesis

Biphenol (1.225 g, 6.577 mmol), 5-[4-((trifluorovinyl)oxy)phenyl]-resorcinol (18.7 mg, 0.0663 mmol), 4,4'-difluorophenylsulfone (DFDPS)(0.6774 g, 2.664 mmol), 4,4'-difluoro-3,3'-disodiumsulfonated-phenylsulfone (s-DFDPS) (1.825 g, 3.982 mmol) and $K_2CO_3$ (1.46 g, 10.6 mmol) were added to the reaction flask and NMP (6.0 ml) and toluene (8.0 ml) were added via syringe. Under a nitrogen atmosphere, the mixture was stirred at 120° C. for 2.5 hours to remove water azeotropically. 0.96 M HEGCl/o-DCB (0.27 ml, 0.26 mmol) was added via syringe, and the molecular weight was monitored by gel permeation chromatography. After 24 hours, the reaction was stopped. GPC, calibrated against polyethyleneoxide standards, showed that $M_w$ and $M_n$ were 80,000 g/mol and 49,100 g/mol, respectively. The highly viscous solution was cooled to RT and then filtered over a pad of Celite and C-frit. The polymer was precipitated with toluene (100 ml) and acetone (100 ml), filtered, washed with acetone and methanol, and dried in vacuo at 80° C. overnight.

Film Casting

Films were machine cast on a glass plate from a 25 wt % polymer and DMAc solution using an Erichsen Model 411 doctor blade. The films were dried at 40° C. Acidification of the basic polymers was accomplished by refluxing the film in 1 M $H_2SO_{4(aq)}$ for 4 hours and then soaking in deionized water for 4 hours. The films were air-dried, redissolved in DMSO (25 wt % polymer), and films were machine cast using an Erichsen Model 411 doctor blade. Non-crosslinked films were stored until AC impedance/conductivity measurements were performed.

Crosslinking Procedure

Non-crosslinked films still attached to a glass substrate were placed in an oven at 200° C. for the desired amount of time. The films were then removed from the glass substrate with water, air dried, and stored until AC impedance/conductivity measurements were performed.

Conductivity Measurements

AC Impedance Measurements Four-electrode AC impedance was used to measure the conductivity of polymer membranes. Measurements used a Parstat impedance analyzer with PowerSine software, using a signal amplitude that ranged from 5 to 50 mV and frequencies ranging from 2 Hz to 2 MHz. The sample dimensions varied between samples, with a typical sample being 1.5 cm×2.5 cm and having a thicknesses ranging from 20 to 100 μm.

Water Uptake Measurements

Water uptake was monitored by percent weight. A given film was allowed to equilibrate in different temperatures (30° C., 60° C., and 90° C.) in a water bath for approximately ten minutes. Once the sample had been equilibrated, it was removed from the aqueous media and quickly dried on a Kimwipe® to remove any surface moisture. The sample was then weighed on a microbalance to determine the percent by mass water uptake.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A compound containing a trifluorovinyloxy group and having the formula $(CF_2CFO(R^1)_p)_nArX_2$
wherein
Ar is selected from

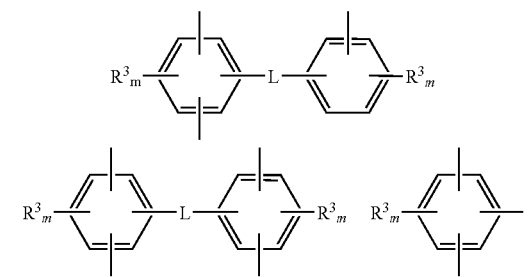

-continued

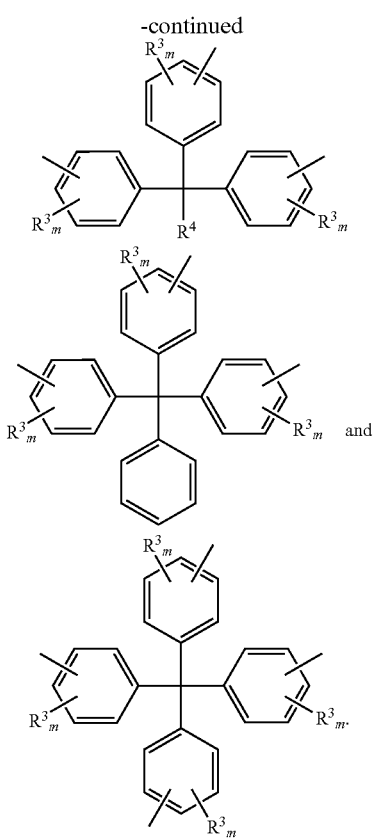

X is OH, SH, NR²R³, F or Br;
p is 0 or 1;
n is 1 or 2;
R¹ is substituted or unsubstituted phenyl and R² is independently H, $C_1$-$C_8$ alkyl or $C_1$-$C_8$ perfluoroalkyl;
R³ is H, aryl, substituted aryl, aryloxy, alkylaryl or arylalkyl, perfluoroalkyl, or halo;
R⁴ is H, $C_1$-$C_3$ alkyl, $C_1$-$C_8$ perfluoroalkyl or aryl;
m is 0, 1, 2 or 3; and
L is a direct bond, O, S, CO, $SO_2$, $CR^1R^2$, $C_yH_{2y}$, $C_yF_{2y}$, or O-Z-O and the bonds of the O or the O-Z-O group are in the 3,3'-, 3,4'-, 4,3'-, or the 4,4'-positions; and
Z is selected from

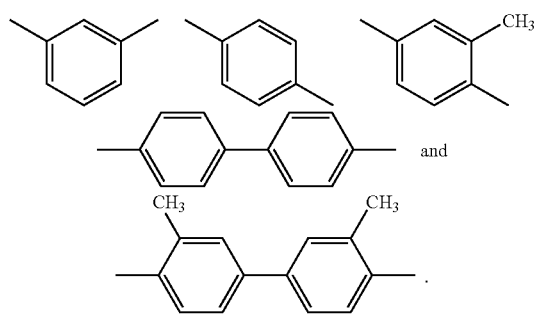

2. A compound according to claim 1 wherein n is 1.
3. A compound according to claim 1, wherein n is 2.
4. A compound according to claim 1, wherein p is 1.
5. A compound according to claim 1, wherein X is OH.

6. A compound according to claim 1, wherein Ar is

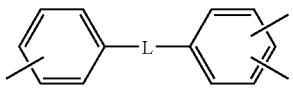

7. A compound according to claim 1, wherein L is $CR^1R^2$.
8. A compound according to claim 1, wherein L is a direct bond.
9. A compound according to claim 1, wherein R³ and R⁴ are H.
10. A compound according to claim 1, wherein m is 1, and Ar is biphenyl.
11. A compound according to claim 1, having a formula

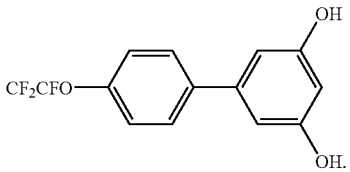

12. A compound according to claim 1, having a formula

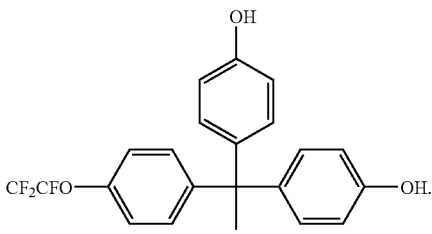

13. A compound according to claim 1
a. wherein
b. p is 1;
c. n is 1 or 2;
d. R¹ is unsubstituted phenyl and
e. R² and R³ are independently H, or $C_1$-$C_8$ alkyl.
14. A polymer comprising structural units derived from a compound according to claim 1.
15. A polymer according to claim 14, additionally comprising structural units derived from at least one aryl ether monomer and at least one aryl ketone monomer.
16. A polymer according to claim 15, additionally comprising structural units derived from at least one aryl sulfone monomer.
17. A polymer according to claim 14, additionally comprising structural units derived from at least one aryl ether monomer and at least one aryl sulfone monomer.
18. A polymer according to claim 17, additionally comprising structural units derived from at least one aryl ketone monomer.
19. A polymer according to claim 14, additionally comprising structural units derived from at least one aromatic anhydride monomer and at least one hydroxy aryl monomer.
20. A polymer according to claim 14, additionally comprising structural units derived from at least one phosphine oxide monomer.

21. A polymer according to claim 14, additionally comprising structural units derived from at least one benzonitrile monomer.

22. A membrane comprising a copolymer derived from condensation copolymerization of a compound according to claim 1.

23. A fuel cell comprising a membrane according to claim 22.

24. A polymer comprising structural units derived from a trifluorovinyloxy compound of formula I and at least one of an aryl ketone monomer and an aryl sulfone monomer;

   I wherein

Ar is a trivalent, tetravalent or pentavalent, substituted or unsubstituted, aromatic or heteroaromatic, monocyclic or polycyclic group having from 5 to 50 carbon atoms;

X is OH, SH, $NR^2R^3$, F or Br;

p is 0 or 1;

n is 1, 2 or 3;

$R^1$ is substituted or unsubstituted phenyl and $R^2$ and $R^3$ are independently H, $C_1$-$C_8$ alkyl or $C_1$-$C_8$ perfluoroalkyl.

25. A polymer according to claim 24, wherein Ar is selected from

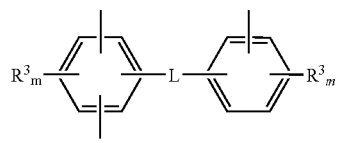

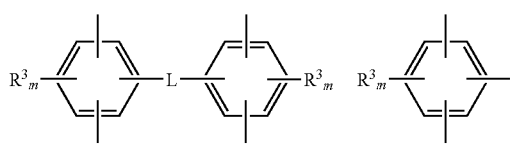

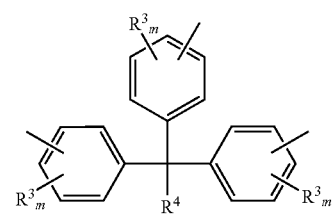

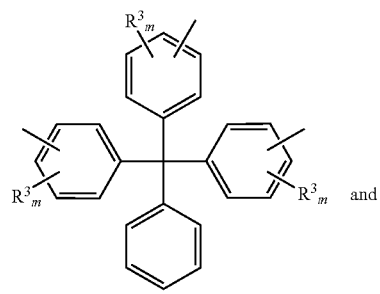 and

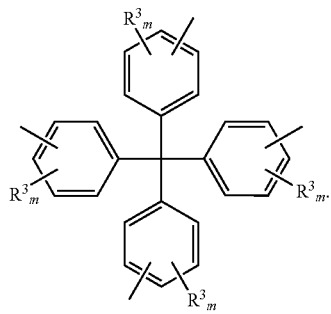

$R^3$ is H, aryl, substituted aryl, aryloxy, alkylaryl or arylalkyl, perfluoroalkyl, or halo;

$R^4$ is H, $C_1$-$C_8$ alkyl, $C_1$-$C_8$ perfluoroalkyl or aryl;

m is 0, 1, 2 or 3; and

L is a direct bond, O, S, CO, $SO_2$, $CR^1R^2$, $C_yH_{2y}$, $C_yF_{2y}$, or O-Z-O and the bonds of the O or the O-Z-O group are in the 3,3'-, 3,4'-, 4,3'-, or the 4,4'-positions; and Z is selected from

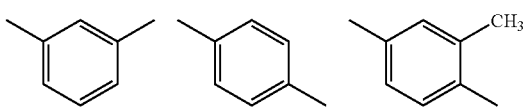

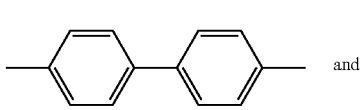 and

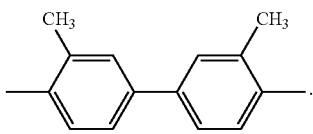

26. A polymer according to claim 24 wherein n is 1 or 2.
27. A polymer according to claim 24, wherein n is 1.
28. A polymer according to claim 24, wherein p is 1.
29. A polymer according to claim 24, wherein X is OH.
30. A polymer according to claim 24, wherein Ar is

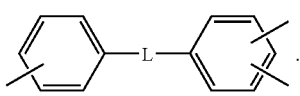

31. A polymer according to claim 24, wherein L is $CR^1R^2$.

32. A polymer according to claim 24, wherein L is a direct bond.

33. A polymer according to claim 24, wherein $R^3$ and $R^4$ are H.

34. A polymer according to claim 24, wherein m is 1, and Ar is biphenyl.

35. A polymer according to claim 24, having a formula

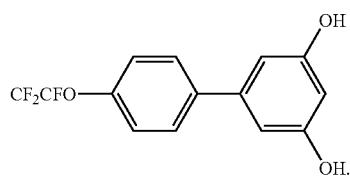

36. A polymer according to claim 24, having a formula

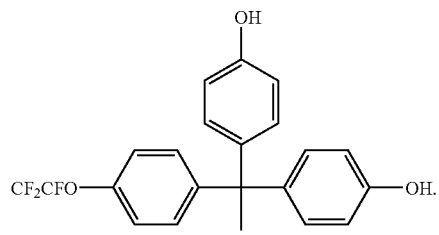

37. A polymer according to claim 24
a. wherein
b. p is 1;
c. n is 1 or 2;
d. $R^1$ is unsubstituted phenyl and
e. $R^2$ and $R^3$ are independently H, or $C_1$-$C_8$ alkyl.

* * * * *

UNITED STATES PATENT AND TRADEMARK OFFICE
CERTIFICATE OF CORRECTION

PATENT NO. : 7,635,744 B2 Page 1 of 1
APPLICATION NO. : 11/397109
DATED : December 22, 2009
INVENTOR(S) : Moore et al.

It is certified that error appears in the above-identified patent and that said Letters Patent is hereby corrected as shown below:

In Column 1, Line 44, delete "pro ion" and insert -- proton --, therefor.

In Column 8, Line 16, delete "bis(p-methyl-b-amino-phenyl)benzene," and insert -- bis(p-methyl-o-amino-phenyl)benzene, --, therefor.

In Column 8, Line 17, delete "bis(p-methyl-b-amino-phenyl)benzene," and insert -- bis(p-methyl-o-amino-phenyl)benzene, --, therefor.

In Column 10, Line 50, delete "(Scheme" and insert -- (Schemes --, therefor.

In Column 16, Line 36, after "layer" insert -- was --.

In Column 17, Line 1, after "layer" insert -- was --.

In Column 19, Line 43, in Claim 1, delete "$C_1$-$C_3$" and insert -- $C_1$-$C_8$ --, therefor.

Signed and Sealed this

Sixteenth Day of February, 2010

David J. Kappos
*Director of the United States Patent and Trademark Office*

UNITED STATES PATENT AND TRADEMARK OFFICE
CERTIFICATE OF CORRECTION

PATENT NO. : 7,635,744 B2  Page 1 of 1
APPLICATION NO. : 11/397109
DATED : December 22, 2009
INVENTOR(S) : Moore et al.

It is certified that error appears in the above-identified patent and that said Letters Patent is hereby corrected as shown below:

In Column 20, Line 41, in Claim 13, delete "a." before "wherein".

In Column 20, Line 42, in Claim 13, delete "b." before "p".

In Column 20, Line 43, in Claim 13, delete "c." before "n".

In Column 20, Line 44, in Claim 13, delete "d." before "$R^1$".

In Column 20, Line 45, in Claim 13, delete "e." before "$R^2$".

In Column 24, Line 15, in Claim 37, delete "a." before "wherein".

In Column 24, Line 15, in Claim 37, delete "b." before "p".

In Column 24, Line 15, in Claim 37, delete "c." before "n".

In Column 24, Line 15, in Claim 37, delete "d." before "$R^1$".

In Column 24, Line 15, in Claim 37, delete "e." before "$R^2$".

Signed and Sealed this

Seventeenth Day of August, 2010

David J. Kappos
*Director of the United States Patent and Trademark Office*